Dec. 1, 1959  E. BUKER  2,915,188
HORIZONTAL LINE STRAINER
Filed Jan. 30, 1957  2 Sheets-Sheet 1

INVENTOR.
Edward Buker.
BY

Dec. 1, 1959
E. BUKER
2,915,188
HORIZONTAL LINE STRAINER
Filed Jan. 30, 1957
2 Sheets-Sheet 2
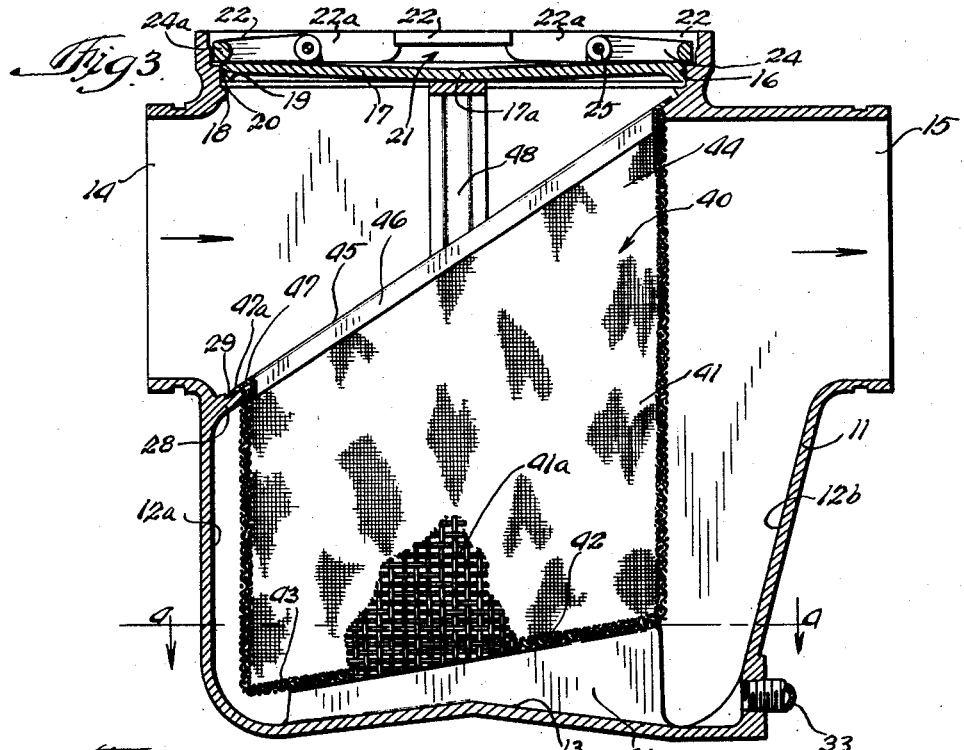
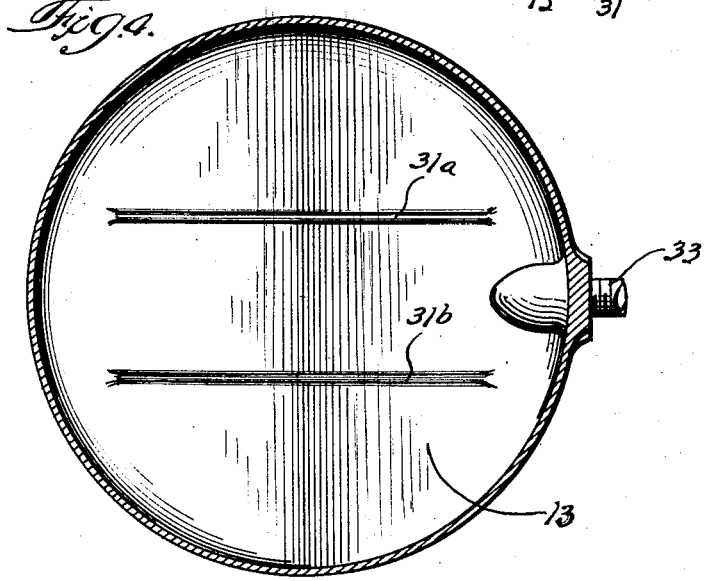
INVENTOR.
Edward Buker.
BY

United States Patent Office 2,915,188
Patented Dec. 1, 1959

2,915,188

HORIZONTAL LINE STRAINER

Edward Buker, Deerfield, Ill., assignor to Coach & Car Equipment Company, Chicago, Ill., a corporation of Illinois Application January 30, 1957, Serial No. 637,277

8 Claims. (Cl. 210—447)

This invention relates to a strainer and more particularly to a horizontal line strainer for filtering a traveling fluid.

Strainers constructed in accordance with this invention are particularly well adapted for use in conjunction with aircraft installations where petroleum products are transported through pipe lines and where weight and space are of considerable importance.

It is to be understood, however, that such strainers may be used in connection with any other type of installations in which pipe lines convey fluids other than petroleum products and where weight, space or efficiency are important considerations.

Present commercial horizontal line strainers have narrow, deep casings and screening elements. The casings of these strainers are usually very heavy and very large, yet the efficiencies of these strainers are not proportionally large. This lack of efficiency may be due to a number of factors among which are the undesirable agitation of the separated foreign material within the strainer, the narrow restricted areas through which the fluid being strained must pass, and the fact that the bottom portion of the strainer is not used for purposes of straining. With present day designs demanding extremely compact and efficient equipment, the need for a newly designed horizontal line strainer has been extensive.

It is one object of this invention to provide a horizontal line strainer which is lighter and which occupies less space than previous horizontal line strainers.

It is another object of this invention to provide a horizontal line strainer which has a much greater screening area and yet which occupies less space than previously designed line strainers.

It is a further object of this invention to provide a horizontal line strainer which is simple yet sturdy in construction and is highly efficient in operation.

It is still another object of this invention to provide a horizontal line strainer which is much easier to service than line strainers of previous design.

Other objects will be seen and a fuller understanding of the invention will be had when referring to the accompanying drawings, taken in conjunction with the following description and claims.

One feature of this invention lies in the construction of the cylindrical basket-like strainer element. This strainer basket is of foraminous construction and is open at its upper end. The bottom of the strainer basket is obliquely disposed with respect to the bottom of the strainer casing such that the distance from the bottom of the strainer casing increases from the inlet side of the line strainer to the outlet side. This permits the use of most of the bottom of the basket for straining and provides one-third more straining area than previously designed line strainers. The portion of the strainer basket bottom nearest the inlet side of the line strainer is adapted to collect the foreign material which is separated from the fluid passing through the strainer. This prevents the foreign material from being collected in places where the flowing fluid would cause excessive agitation thereof and lower the efficiency of the line strainer.

Another feature of this invention is the design of the strainer casing. The improved casing is somewhat irregular in shape being substantially cylindriform on its inlet side and having its outlet side substantially elliptical in cross section. This irregular shape in combination with the cylindrical basket results in a greater distance between the strainer casing walls and the basket as the outlet of the casing is approached. The casing is compact as well as very shallow and very wide compared to casings of previous design. This construction presents a larger screening area adjacent the outlet port than was possible with the previously designed strainers.

Another feature of this invention is the lid or cover plate design. This lid has a peripheral seal which permits the lid to float in position and eliminates the need for large flanges, gaskets and anchoring bolts such as were required in strainers of previous design to effect the seal. The lid has a portion thereof which contacts a portion of the strainer basket to maintain proper positioning of both the lid and basket and to effect the necessary seal between the strainer casing and basket. A novel locking mechanism is provided for the strainer lid wherein no tools are required to open the lid and to service the strainer.

With more particular reference to the drawings:

Fig. 3 is a sectional side elevation of the strainer taken substantially on line 3—3 of Fig. 1;

Fig. 4 is a sectional view taken along line 4—4 of Fig. 3.

Figure 1:
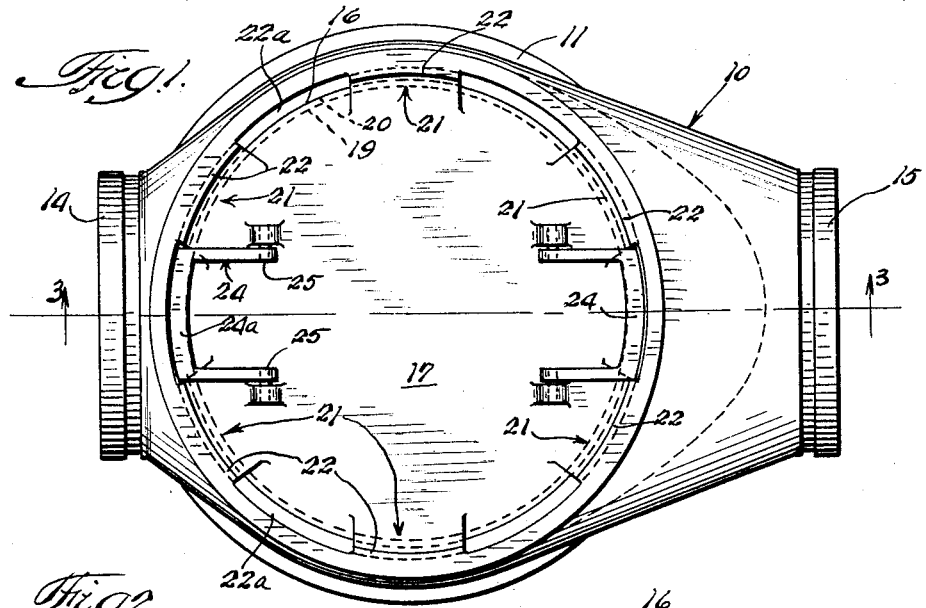
Figure 1 is a top plan view of the line strainer constructed in accordance with this invention.
Figure 2:
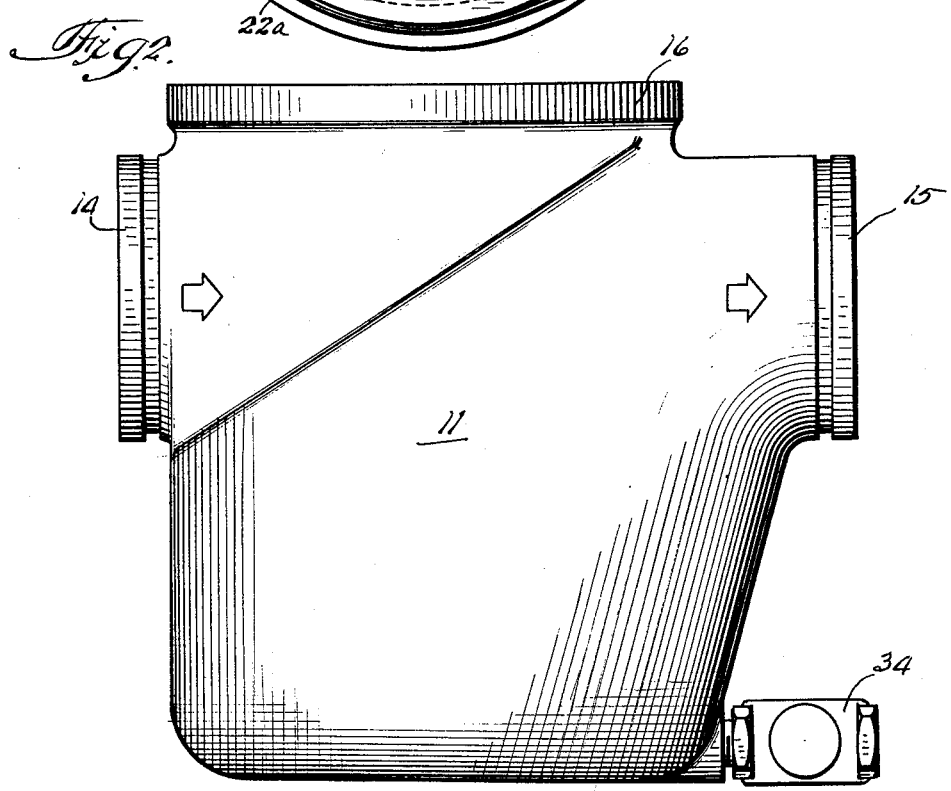
Fig. 2 is a side elevational view of the line strainer.

Figs. 1 and 2 show the exterior of the line strainer 10 with its casing 11 having formed therein an integral inlet 14 and outlet 15 which, in this instance, are disposed in aligned horizontal spaced relation with respect to one another. Substantially centrally disposed on the top of casing 11 is an enlarged access port 16. As may be seen in Fig. 2 the depth of the casing, in this instance, is no greater than the over-all width of the casing. This configuration yields the minimum bulk and weight for the casing, and as will be shown permits a greater strainer volume and efficiency due to less pressure drop in the line.

Fig. 3 shows the interior of the casing 11 with a cylindrical strainer basket 40 in place. The interior of strainer casing 11 includes interior wall portions 12a and 12b and convex bottom portion 13. Wall portion 12a of the casing is substantially cylindriform whereas wall portion 12b varies in shape from circular in cross section to very elliptical in cross section. Casing wall portion 12b becomes more elliptical in cross section as it approaches the outlet 15 of the line strainer.

Vertical access port 16 is adapted to accommodate a circular lid 17 which has a slightly convex concealed surface. The depressed mid-portion 17a of lid 17 is adapted to contact a portion of strainer basket 40 as will hereafter be described.

An annular shoulder 18 is also provided within port 16 to prevent lid 17 from falling into the interior of the casing if it should be inserted without the supporting basket.

Lid 17 has a circumferential groove 19 in which is disposed a portion of an O-ring 20 formed of resilient gasket material. When the lid is positioned within the access port 16, the O-ring 20 is compressed between the periphery of the lid and the interior walls of the access port and effects an efficient liquid seal between the lid and casing. As may best be seen in Fig. 1, lid 17 has a plurality of symmetrically arranged relatively spaced protruding peripheral flange portions 21 which are adapted to engage beneath a plurality of corresponding inwardly extending flange portions 22 formed on the portion of the casing circumjacent port 16 and thus provide a breach lock type of securement.

The spaces 22a between the flange portions 22 are of greater dimension than the flange portions 21 and thus when portions 21 are in registration with these spaces, the lid 17 may be readily inserted into or removed from access port 16. Subsequent to the flanges 21 having passed through the corresponding casing spaces 22a and the lid being disposed in overlying relation with respect to port 16, the lid may then be rotated so that flange portions 21 slidably move under flange portions 22. For this purpose pivotally mounted handles 24 may be provided on the exposed sides of the lid which, in addition to enabling the lid to be rotated to interengage the respective flange portions of the casing 22, also serve to prevent relative turning of the lid with respect to the casing after these flange portions have been thus engaged. This latter function is accomplished when the handles are disposed within spacings 22a and the bails 24a of the handles are adjacent the periphery of the lid. Other forms of handles or handle may be utilized without departing from the scope of the present invention.

Formed in the interior of casing 11 and obliquely disposed, preferably at an angle of approximately 30°, with respect to the horizontal axis of inlet 14 and outlet 15 is a substantially annular rib 28, which extends inwardly from the casing inner wall and is positioned such that its portion adjacent the inlet 14 is located below the same while the opposite side is located above the outlet port 15. Rib 28 has an accurately machined surface 29 which is adapted to provide a seal with a portion of the strainer basket 40. as will hereafter be seen. The circumferential oblique disposition of internal rib 28 provides an aperture which is elliptical with respect to the line of fluid flow through the strainer.

Extending upwardly from the bottom portion 13 of the casing 11, as best illustrated in Figs. 3 and 4, are a pair of supporting webs 31a and 31b. The upper extremities of these webs lie in a plane which is obliquely disposed with respect to the vertical axis of the strainer such that they provide support for the correspondingly disposed bottom portion of the strainer basket 40. A drain 33 and plug valve 34 permit easy drainage of the residual liquid from the casing.

The combination of the irregular shape of the casing 11 and the substantially cylindrical strainer basket 40 results in the distance between the basket and the interior casing walls 12a and 12b constantly increasing as the casing outlet 15 is approached. This means that the greatest free flow area is present exactly where it is most needed and the amount of free flow space at any one point is approximately proportional to the amount of fluid flowing through the strainer basket at that point.

Strainer basket 40, as heretofore mentioned, is substantially cylindrical in shape and has a substantially flat inclined bottom 42 and an obliquely disposed open upper end 44. The basket is foraminous and may be of two ply construction having a relatively fine mesh screen inner section 41 and a relatively heavy mesh screen outer section 41a, the latter providing support for said inner section. Bottom 42, as heretofore mentioned, is obliquely disposed with respect to the vertical axis of the basket element 40, the inclination of said bottom being substantially the same as the inclination of the upper edge of webs 31a and 31b. When the basket is properly positioned within the casing, bottom 42 slopes upwardly relative to the bottom of the strainer casing from the inlet side to the outlet side of the line strainer. Portion 43 of the bottom 42 of the basket, adjacent the inlet side of the casing, is adapted to collect the foreign material which is separated from the fluid flowing through the casing. Bottom portion 43 is the section of the basket 40 which is farthest disposed from outlet 15, and the accumulation of the foreign material in the basket in this portion has but a minimum effect on flow of the fluid through the remainder of the basket because there is little or no agitation of the foreign material by the fluid current in this portion. Thus, clogging of the remainder of the basket by the accumulated foreign material is greatly minimized.

By reason of the upward slope of bottom 42 the latter functions more effectively as a strainer and thus increases materially the straining area of the basket. In most instances this increase is in the order of approximately one-third more area. Bottom 42, when in position within the casing 11, rests upon the correspondingly inclined upper edges of supporting webs 31a and 31b which extend upwardly from convex bottom portion 13 of the strainer casing. The combination of the convex shape of casing bottom 13 and the upward slope of strainer basket bottom 42 results in a very slight increase in the distance between bottom portion 43 and casing bottom 13 in approaching the outlet while the distance between casing 11 and the remainder of basket bottom 42 is thereafter increased in very large increments in approaching the outlet. This novel cooperation of shapes produces less turbulence in portion 43 and yet greater fluid flow through the remainder of bottom 42.

It will be noted that in the particular embodiment illustrated in the drawings more than half of the screen depth on the portion of basket 40 adjacent the outlet is positioned directly in the path between inlet port 14 and outlet port 15.

With applicant's design the basket open end 44 is very wide and approaches the depth of the basket measured along the outlet-adjacent side. With the gradual 30° slope of the open end 44 an unusually large area of filtering screen is available between the inlet and outlet ports. This is the optimum design for achieving unimpeded fluid flow through the strainer and results in minimum pressure drop in the line.

The open upper end 44 of the basket is delimited by an annular rim 45 having a downwardly extending flange portion 46, to which the inner and outer screen sections 41 and 41a are attached, and an outwardly extending flange 47. Flange 47 has a machined under surface 47a which overlies and contacts the correspondingly machined surface 29 of rib 28 of the casing and effects a fluid seal therebetween when the basket 40 is inserted and properly positioned within the casing.

It is apparent that the seal is effected by under surface 47a of the basket being pressed into contact with surface 29 of the casing. Such a seal is not dependent upon the interfitting of two cylindrical surfaces as was the case with line strainers of previous design. With these coaxial seals it was not commercially possible to obtain sufficient accuracy to permit efficient operation of a very fine filter such as would be necessary in strainers used in the aircraft industry. Slight distortions in these coaxial surfaces would result in leakage ports of larger dimensions than the screen apertures. Thus not only was the performance of such strainers unsatisfactory but also large gaskets and supplementary sealing elements were required.

Applicant's design completely eliminates the necessity for such additional sealing elements and gaskets and provides a very effective seal, the required accuracy of which is well within that available with current commercial manufacturing and assembly methods.

Extending upwardly from rim 45 is inverted U-shaped bail 48 which serves two important functions, namely, to permit the strainer basket to be readily removed through access port 16 without contacting the fluid retained in the casing when lid 17 is removed, and secondly, to provide a resilient member which is contacted by the concealed surface of the lid to produce an effective vertically acting spring force on the basket.

In operation the strainer permits the unfiltered liquid to enter through the inlet 14 and pass through the elliptical opening 44 bounded by rim 45 of the basket and rib 28 of the casing. Much of the liquid passes through the area of the strainer immediately in front of outlet 15. Various amounts of the liquid, however, flow downwardly against the lower side of the cylindrical basket and against basket bottom 42, those portions of the basket 40 farthest from the outlet port 15 being subjected to proportionally less fluid flow and agitation. The fluid which flows downwardly through the bottom of the strainer basket passes freely toward the outlet 15 flowing horizontally parallel to the two supporting webs 31 and 31b, and then vertically through the rapidly expanding free flow area between casing wall portion 12b and the side of strainer basket 40 and thence into outlet 15. It may be seen that as the screened liquid approaches outlet 15 from any portion of the screen through which it has passed, the area is continuously increasing.

When it is desired to service the line strainer, handles 24 are pivoted to an upwardly extending position whereupon lid 17 is rotated until the flanges 21 are disposed in spaces 22a thereby permitting the lid to be lifted off the casing. When the lid is removed, the basket bail 48 is readily accessible for lifting the basket 40 out of the casing interior. Because of the shallow character of the basket, the foreign material accumulated therein may be readily removed and the basket effectively cleaned. The residual fluid remaining in the casing may be drained through a normally plugged port 33 formed adjacent the bottom of the casing.

Thus it may be seen that applicant has invented a new and useful line strainer which is compact, lightweight, and simple in construction, is readily serviceable, and effective in operation.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In a line strainer comprising a hollow casing provided with an inlet port, an outlet port in relatively spaced relation with respect thereto, and an access port; a lid removably mounted on said casing within said access port, and a foraminous open end basket element removably mounted within said casing between said inlet and said outlet ports, a resilient annular O-ring set within and extending outwardly from the periphery of said lid and sealingly engaging the casing wall circumjacent said access port when said lid is inserted therein, a plurality of symmetrically arranged relatively spaced flanges extending outwardly from said lid, a plurality of inwardly extending flanges formed on the portion of the casing circumjacent said access port, said outwardly extending lid flanges adapted to fit between and to be rotated under said inwardly extending casing flanges into a latched position, at least one handle pivotally mounted on said lid and adapted to pivot into horizontal position between two adjacent inwardly extending casing flanges when said lid is rotated into the latched position, whereby relative rotation between said lid and casing may be prevented.

2. In a line strainer comprising a hollow casing provided with an inlet port, an outlet port in relatively spaced relation with respect thereto, and an access port; a lid removably mounted on said casing within said access port, and a foraminous open end basket element removably mounted within said casing between said inlet and said outlet ports, said casing having the interior thereof provided with an inwardly extending annular rib obliquely disposed with respect to the axis of said inlet port, said element having the open end thereof correspondingly obliquely disposed with respect to said inlet port and having an adjacent outwardly extending peripheral flange the under surface of which sealingly engages the corresponding upper surface on the annular rib of said casing interior, said lid resiliently contacting a protruding portion of said element and exerting a downward force thereagainst and effecting a sealing engagement between said peripheral flange and the upper surface of said annular rib, a resilient annular O-ring set within and extending outwardly from the periphery of said lid and adapted to sealingly and frictionally engage the casing wall circumjacent said access port when said lid is inserted therein, a plurality of symmetrically arranged relatively spaced flanges extending outwardly from said lid, a plurality of inwardly extending flanges formed on the portion of the casing circumjacent said access port, said outwardly extending lid flanges adapted to fit between and to be rotated under said inwardly extending casing flanges into a latched position, and means for locking said cover plate in place after it has been rotated into the closed position.

3. In a line strainer comprising a hollow casing provided with an inlet port, an outlet port in relatively spaced relation with respect thereto and an access port; a lid removably mounted on said casing and in overlying relation with said access port, and a foraminous open end basket element removably mounted within said casing between said inlet and said outlet ports, said element open end being obliquely disposed with respect to the axis of said inlet port at an angle of approximately 30°, and being relatively wide as compared with the depth of said element, said element being cylindrical and having a foraminous bottom inclined upwardly toward said outlet port, the interior of said casing being cylindriform adjacent the inlet port and elliptical adjacent the outlet port and having its outlet adjacent wall sloping upward and outward from the casing bottom, whereby the flow space between the exterior of said element and the interior surface of said casing increases in the direction of the outlet port.

4. In a line strainer comprising a hollow casing provided with an inlet port, an outlet port in relatively spaced relation with respect thereto, a seat between said inlet and outlet ports and an access port, and a lid removably mounted on said casing and in overlying relation with said access port, a foraminous open end basket element removably mounted within said casing between said inlet and said outlet ports, and with its open end sealingly engaging said seat and in opposing relation to and inclined upwardly from said inlet port and being wider than the depth of said basket element, said basket element being cylindrical and having a foraminous bottom spaced from and inclined upwardly away from the bottom of said casing in a direction toward said outlet port, the interior of said casing being cylindriform adjacent the inlet port and elliptical adjacent the outlet port and having its outlet adjacent wall sloping upward and outward from the casing bottom, whereby the flow space between the exterior bottom surface of said basket element and the interior surface of said casing increases toward the outlet port.

5. In a line strainer of the type including a hollow casing provided with an inlet port, an outlet port in relatively spaced relation with respect thereto, a seat between said inlet and outlet ports and an access port and a lid removably mounted on said casing and in overlying relation with said access port, and a foraminous open end basket element removably mounted within said casing between said inlet and said outlet ports and with its open end sealingly engaging said seat and in inclined opposing relation to the axis of said inlet port, the improvement wherein said basket element has a foraminous bottom spaced from and inclined upwardly away from the bottom interior wall of said casing in a direction toward said outlet port, whereby the flow space between the exterior bottom surface of said element and the interior bottom surface of said casing increases toward the outlet port.

6. In a line strainer comprising a hollow casing provided with an inlet port, an outlet port in relatively spaced relation with respect thereto, a seat between said inlet and outlet ports and an access port, and a lid removably mounted on said casing and in overlying relation with said access port, and a foraminous open end basket element removably mounted within said casing between said inlet and said outlet ports and with its open end sealingly engaging said seat and in inclined opposing relation to the axis of said inlet port, the improvement wherein said casing has a rib upstanding from the interior bottom wall of said casing, and said basket element has a foraminous bottom spaced from and inclined upwardly away from the bottom interior wall of said casing in a direction toward said outlet port, and resting on said rib, whereby the flow space between the exterior bottom surface of said element and the interior bottom surface of said casing increases toward the outlet port.

7. In a line strainer of the type including a hollow casing provided with an inlet port, an outlet port in relatively spaced relation with respect thereto, a seat between said inlet and outlet ports and an access port, and a lid removably mounted on said casing and in overlying relation with said access port, a foraminous open end basket element removably mounted within said casing between said inlet and said outlet ports and with its open end sealingly engaging said seat and in inclined opposing relation to the axis of said inlet port, the improvement wherein said casing has a plurality of spaced parallel ribs upstanding from the bottom interior wall of said casing and extending in a direction from said inlet port toward said outlet port, said basket element having a foraminous bottom spaced from and inclined upwardly away from the bottom interior wall of said casing in a direction toward said outlet port and resting on said ribs, whereby the flow space between the exterior bottom surface of said element and the interior bottom surface of said casing increases toward the outlet port.

8. In a line strainer of the type including a hollow casing provided with an inlet port, an outlet port in relatively spaced relation with respect thereto, a seat between said inlet and outlet ports and an access port, and a lid removably mounted on said casing and in overlying relation with said access port, a foraminous open end basket element removably mounted within said casing between said inlet and said outlet ports and with its open end sealingly engaging said seat in inclined opposing relation to the axis of said inlet port, the improvement wherein said basket element has a foraminous bottom spaced from and inclined upwardly away from the bottom interior wall of said casing in a direction toward said outlet port, whereby the flow space between the exterior bottom surface of said element and the interior bottom surface of said casing increases toward the outlet port and said bottom interior wall and the exterior bottom surface of said basket element mutually diverge in a direction from said inlet port toward said outlet port, with said divergence being greater between the portions of said bottom exterior surface and said bottom interior surface which are nearer to said outlet port.

References Cited in the file of this patent
UNITED STATES PATENTS

| | | |
|---|---|---|
| 1,152,831 | Monteagle | Sept. 7, 1915 |
| 1,239,704 | Lee et al. | Sept. 11, 1917 |
| 2,162,043 | Westlund et al. | June 13, 1939 |
| 2,568,181 | Zimmerman et al. | Sept. 18, 1951 |
| 2,801,008 | Schmid | July 30, 1957 |